Figure 1:
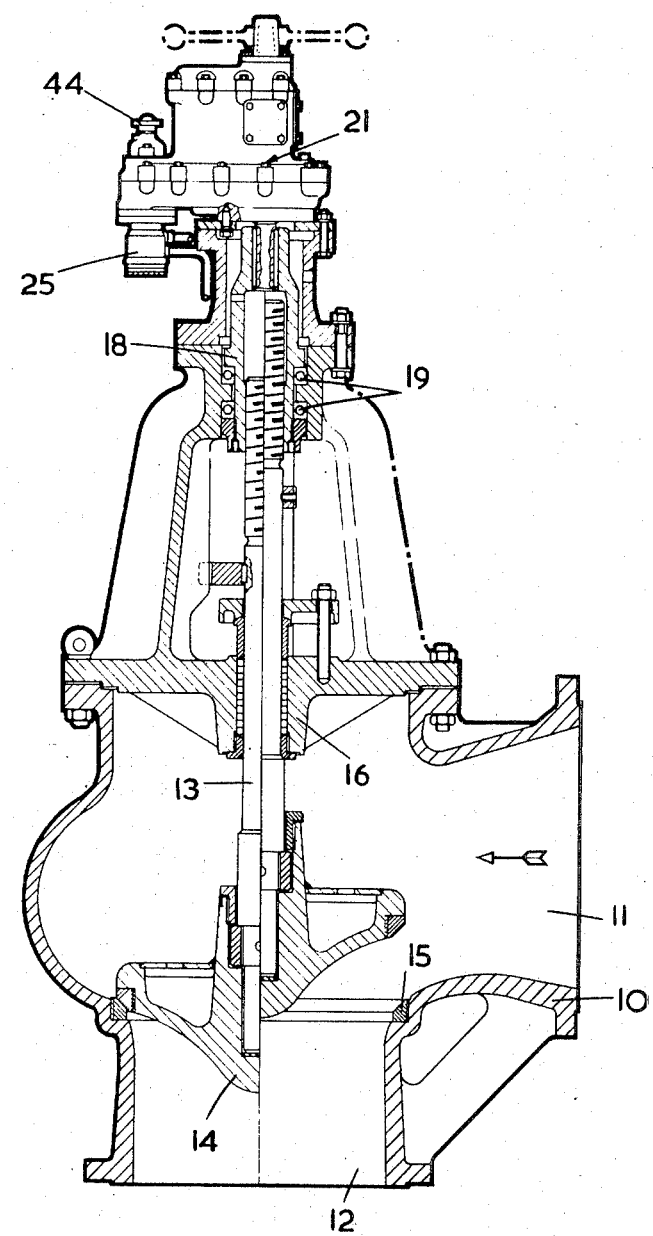

United States Patent [19]
Morrison

[11] 3,819,147
[45] June 25, 1974

[54] VALVE ACTUATORS
[76] Inventor: William McKenzie Meek Morrison, Shandon, 107, Coalway Rd., Wolverhampton, Staffordshire, England
[22] Filed: Feb. 9, 1973
[21] Appl. No.: 331,197

[30] Foreign Application Priority Data
Feb. 9, 1972 Great Britain .................. 6102/72

[52] U.S. Cl. ............................................ 251/14
[51] Int. Cl. ...................................... F16k 31/143
[58] Field of Search .................................. 251/14

[56] References Cited
UNITED STATES PATENTS
2,709,062 5/1955 Lamb.................................. 251/14

*Primary Examiner*—Henry T. Klinksiek

[57] ABSTRACT

A valve actuator, particularly for oil tanker ships, the actuator having a hydraulic motor to drive an actuating rod of the valve, and a hydraulic control valve which regulates the supply of hydraulic fluid to the motor in accordance with the actuator rod position so that differing forces are applied to the valve during opening and closing.

7 Claims, 4 Drawing Figures

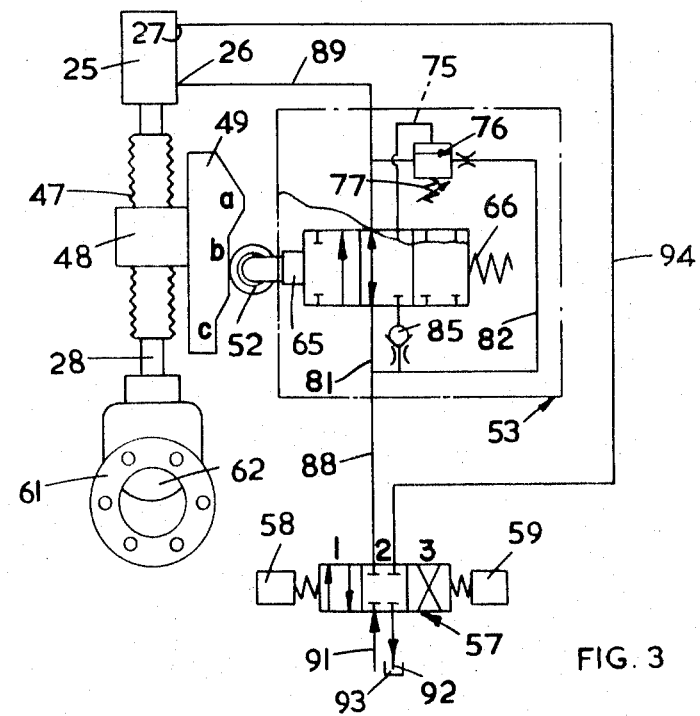
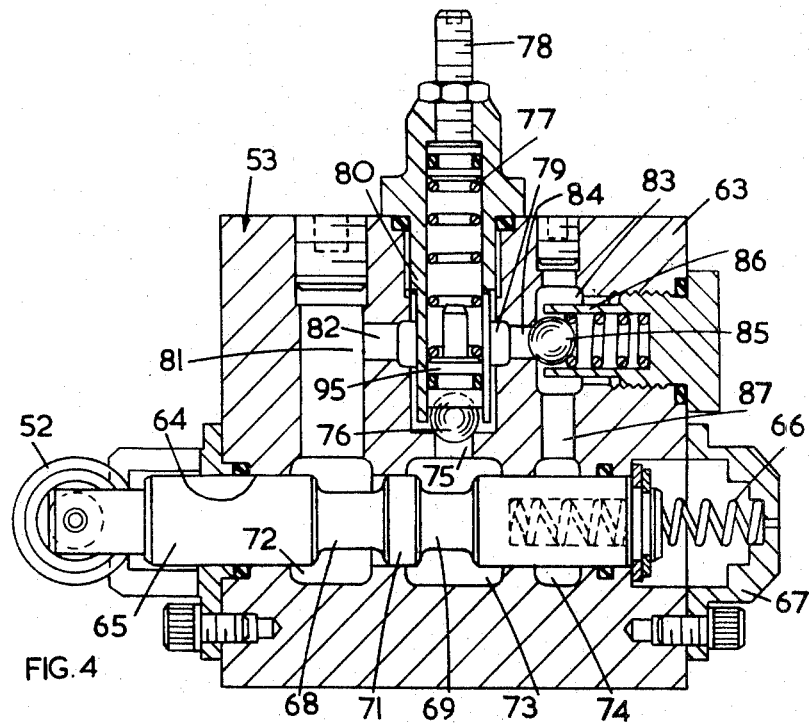

VALVE ACTUATORS

This invention relates to mechanisms for actuating valves. In particular the invention concerns power operation of large valves such as the cargo valves of oil tanker ships.

Such a vessel has numbers of these valves which are situated in places which are, in many cases, inaccessible for direct manual actuation. For example many of the valves are at or near the bottom of the cargo holds and are thus many feet below the deck of the vessel. To enable such valves to be operated, they are connected to devices known as deck stands which incorporate manual control wheels or power operated mechanisms for actuating their associated valves. Some valves are however directly operated through similar deck stand mechanisms of which they form a part.

It has been said that these valves may be very large and for this reason alone, manual actuation may not be practical. However, there are other reasons why manual actuation is not convenient. The nature of the cargo and the form and operating frequency of the valves are such that the valves frequently become stuck in their closed positions. Many of them are only operated at the beginning and end of a voyage. This being so, the force required to actuate some of the valves, particularly on opening, is very great and may well be in excess of that which can be applied manually. However, once the closure member is off its seating, a valve may continue to open with little resistance.

The loading and discharge of cargo in a large tanker ship requires careful control which is achieved by actuation of valves in precise sequence. It is therefore necessary that reliable operation is achieved. It is convenient, and in larger vessels virtually essential, to provide remote control for the valves and this is achieved by power actuating mechanisms, housed within the deck stands. Known power actuated mechanisms however do not regulate opening speed and torque in ways that can be achieved manually.

Many power operated mechanisms have been proposed but conditions of operation are so severe that many of them are unsatisfactory. There are two major factors involved. One is the fire risk, which substantially precludes the use of electricity except at extremely low voltages. The other is corrosion caused by the action of sea water. This precludes the use of delicate mechanisms and extensive exposed pipe work on the deck stands.

It is the object of this invention to provide a valve actuator for a valve which can satisfactorily operate the valve under operating conditions described.

According to the present invention a valve actuator comprises a housing, a hydraulically operated motor arranged to drive an actuating rod in the housing, the rod being connectible to a valve to be actuated, and a hydraulic control valve for regulating the supply of fluid to the motor in accordance with the position of the actuating rod in the housing.

Figure 2:
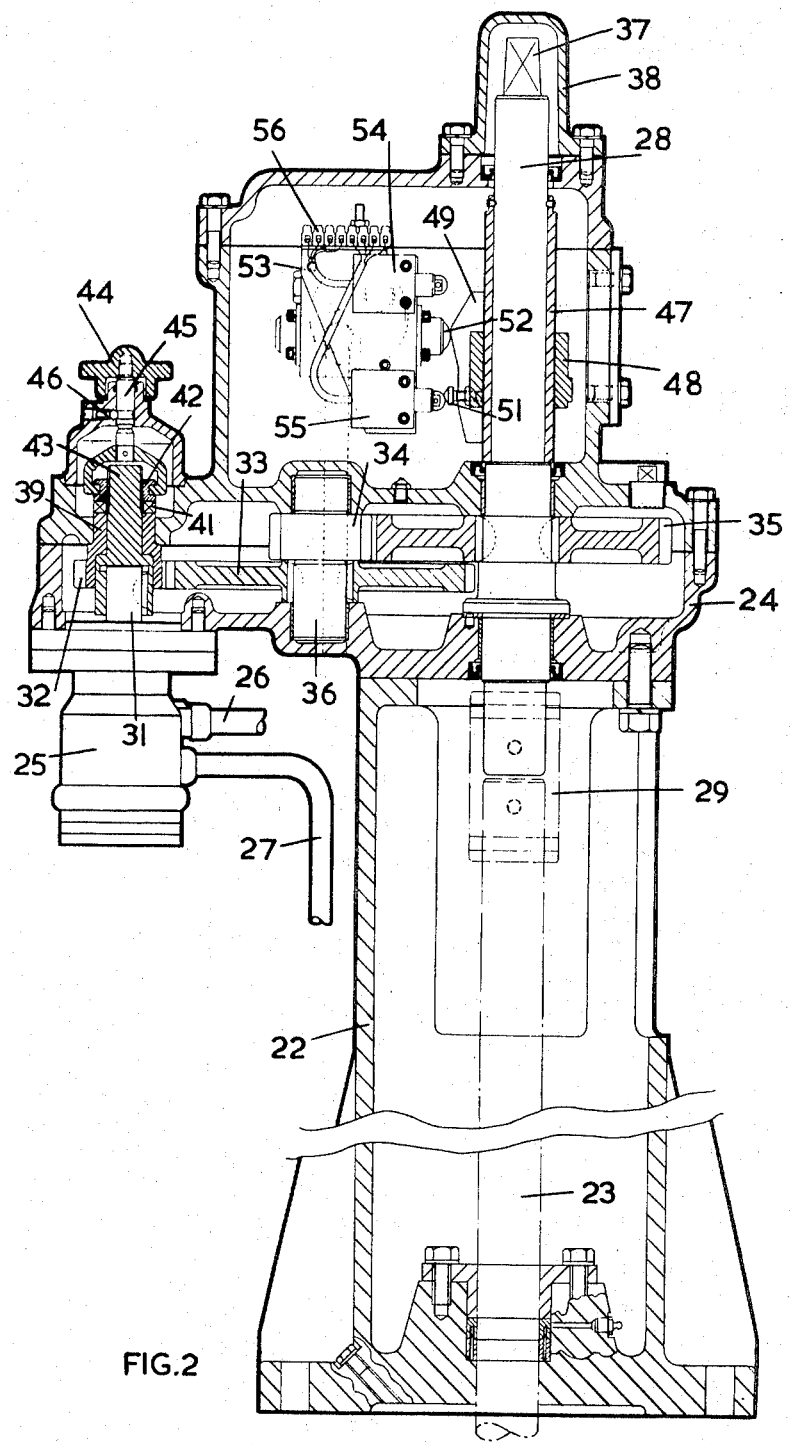

The invention will now be described by way of example with reference to the accompanying drawings in which, FIG. 1 is a cross sectional view of a valve with associated valve actuator constructed in accordance with the invention, FIG. 2 is a deck stand valve actuator constructed in accordance with the invention, FIG. 3 is a diagrammatic representation of the control circuit associated with the valve actuator and valve in accordance with the invention and FIG. 4 is an enlarged cross sectional view of a control valve in the actuator.

In FIG. 1, there is illustrated a cargo valve, having a casing 10 with an inlet 11 and an outlet 12. Within the casing, is supported a rod 13 carrying a valve closure member 14. This is of mushroom form and engages a seating 15 within the housing and situated between the inlet 11 and the outlet 12.

To open the valve, the rod 13 is moved axially in a guide sleeve 16. The end of the rod 13 remote from the closure member 14 is screw threaded to engage in a rotatable nut 18 mounted in bearings 19 in the body of the valve.

To rotate the nut 18, there is an actuator indicated generally at 21 which will be more fully described.

The valve illustrated in FIG. 1 is intended to be mounted upon deck or in another position on an oil tanker ship and there is provision for connection of pipes to the inlet 11 and the outlet 12 respectively.

In FIG. 2 there is illustrated an actuator for use in alternative circumstances wherein the valve is a considerable distance from a position at which access can be gained to it. The actuator illustrated is mounted in such accessible position at a deck stand. The deck stand includes a base 22 which contains a bearing for a rod 23 which is adapted for connection to a nut similar to the nut 18 in the FIG. 1 construction. Alternative mechanisms for actuating the valve closure member may, however, be incorporated but in all cases, associated with the FIG. 2 construction, the valve is actuated by rotation of the rod 23.

The actuator illustrated is hydraulically operated and includes a composite housing 24 mounted upon the stand base 22. The housing has attached to it, a hydraulic motor 25 with external fluid inlet and outlet pipes 26, 27.

Within the housing is journalled a rod 28 which is connected to the rod 23 through a co-axial coupling 29. Between the output shaft 31 of the hydraulic motor 25, and the rod 28 are gears 32, 33, 34, 35 whereby rotation of the hydraulic motor 25 causes rotation of the rod 28 at a substantially slower speed. The gears 33, 34 are mounted upon an intermediate spindle 36. The upper end of the rod 28 moreover, is squared at 37 and this portion is enclosed within a detachable cap 38, so that manual rotation of the rod 28 can be carried out by means of a detachable wheel or spanner.

However, if such manual rotation is to be carried out, it is necessary to disconnect the drive to the hydraulic motor 25. This is accomplished through a releasable coupling on which the gear 32 is formed and engaging through dogs 41, with a sleeve 42 which is spline engagement with an extension 43 of the motor shaft 31.

The dogs 41, can be disengaged by sliding the sleeve 42 along the splines of the shaft extension 43. This can be accomplished from outside the housing by means of a knob 44. The knob is mounted upon a short spindle 45, which can be held in either of two selected positions corresponding with engagement and disengagement of the dogs 41 respectively, by a spring loaded detent 46.

Non-rotatably secured to the rod 28, within the casing 24, is an externally screw threaded sleeve 47. Engaging this sleeve is a nut 48 to which is secured a plate cam 49. The nut 48 also carries an adjustable headed pin 51 which extends radially from it. The nut 48 is prevented from rotation within the housing so that rotation of the rod 28 causes it to move axially on the rod.

Engaging the edge of the plate cam 49, is a spring loaded roller 52 which forms part of a control valve 53 which is shown on a larger scale in FIG. 4. On the body of the control valve 53 furthermore, are mounted two micro switches 54, 55 which can engage with the pin 51 as the nut 48 moves along the sleeve 47.

These micro switches 54, 55 are moreover connected with a terminal block 56. Electrical circuits connected to the terminal block 56 control the supply of hydraulic fluid to the motor 25.

Mounted on the outside of the actuator housing 24, is a further valve (not shown in FIG. 2 but identified at 57 in FIG. 3). This is a three position valve and it has an external manual control as well as a pair of electrical solenoids 58, 59 for alternative actuation. The micro switches 54 and 55 are provided for remote indication of the open or closed position of the valve, for example by illuminated signal lamps.

The positions of the cam 49 and of the pin 51, are directly related to the degree of opening of the valve associated with the actuator, this being apparent from FIG. 3. In this Figure, 61 represents a valve to be actuated. The closure member of this valve, 62 is connected through a nut and rod to a rotatable rod 28 of the actuator. The rod 28 is driven, in this case directly, by a hydraulic motor 25 and is surrounded by an externally screw threaded sleeve 47. Engaging this sleeve is a nut 48 which has connected to it, the plate cam 49. Engaging the plate cam is a roller 52 which is part of a control valve 53.

FIG. 3, illustrates the control valve 53 diagrammatically and FIG. 4 illustrates the same valve in cross section. This valve comprises a body 63 containing in a bore 64, a spool 65, to one end of which the roller 52 is mounted. The other end of the spool has a recess into which extends a compression spring 66. The compression spring engages a detachable cap 67 on the body 63. The spool is therefore, spring loaded to cause maximum protrusion of the spool out of the body. The roller 52 is thus, spring urged against the edge of the plate cam 49. The spool has two grooves 68, 69 separated by a land 71. The bore 64 in the body 63 has three spaced cavities 72, 73, 74.

The spool 65 can occupy three positions identified by a, b, and c in FIG. 3. In position a, the spool blocks communication between cavities 72 and 73 but permits communication between 73 and 74. In position b, only communication between 72 and 73 can take place. In position c, which is that illustrated in FIG. 4, all the cavities 72, 73 and 74 are blocked from one another.

The valve 57 moreover, also has three positions represented by 1, 2 and 3 in FIG. 3. The cavity 73 has an outlet 75 which can be blocked by a spring loaded ball 76. The loading of the spring 77, behind this ball is adjustable by means of an externally accessible screw 78. The ball and spring are moreover, supported in a sleeve 80 which offers a restriction to flow of fluid through the passage outlet 75 and to a cavity 79 surrounding the sleeve 80. The cavity 79 moreover communicates with the cavity 72 in the bore 64 through passages 81, 82. Further communication between the cavity 79 and a cavity 83 takes place through a passage 84. This passage is however, normally blocked by a spring loaded ball 85, mounted in a sleeve 86 which like the sleeve 80, extends into the flow path past the ball.

A still further passage 87 affords communication between the cavity 83 and the cavity 74 in the bore 64.

The body 63 of the control valve 53 has an inlet 88 and an outlet 89 which are identified in FIG. 3. The inlet 88 is connected to the outlet of the valve 57 and can communicate through that valve with either of two passages 91, 92 through that valve depending upon its position. The passage 91 communicates with a source of fluid under pressure and the passage 92 communicates with a reservoir 93.

The outlet passage 89 from the control valve 53 communicates with the cavity 73 in the bore 64 of that valve and the inlet 88 to the control valve communicates with the passage 81 which in turn communicates with the cavity 72 in the bore 64 of the control valve 53.

Between the valve 57 and the hydraulic motor 25, there is a further passage 94 communicating with the motor through the pipe 27.

The actuator can be operated to open to close the cargo valve and can be hydraulically locked in either position by means of the valve 57. In position 2, of that valve, such hydraulic lock is applied since no flow can take place between the passages 91 and 92. If, however, the valve is to be opened, the valve 57 is moved so that the spool occupies the position 1. In this case, flow can take place to the hydraulic motor from the supply passage 91 and from the motor to the reservoir, 93.

To reverse the motor to close the cargo valve, the connections are reversed by moving the valve 57 to the position 3.

However, the control valve 53, regulates the speed and torque of the motor 25. The position of the spool 65 of the valve 53, is moreover, governed by the position of the nut 48 relative to the rod 28 and thus by the degree of opening of the cargo valve. The face cam 49 has three separate portions marked a, b and c, in FIG. 3 and these correspond with the positions which the valve spool 65 can occupy.

If the cargo is closed, the roller 52 will engage the edge of the face cam at the position marked a. In this position, cavity 73 and 74 in the bore of the body are in communication, but cavity 72 cannot communicate with 73.

If now it is desired to open the cargo valve, the valve 57 is moved to the position 1. Fluid under pressure will now reach the passage 88 and return can take place through 94 to the reservoir 93. Fluid can however, only reach the motor 25 through the non-return valve 85, with its associated restrictor formed by the sleeve 86. This results in slow movement of the rod 28 but the hydraulic pressure is normally sufficient to open any stuck cargo valve.

As the valve begins to open, the cam rides on to the portion b, of the plate cam 49. In this position, which is illustrated in FIG. 3, the cavity 72 and 73 are in communication though cavity 74 is cut off. Flow can now take place directly from 88 to 89, through the passage 81 and the cavities 72, 73.

Faster operation of the valve will now take place. When the roller 52 reaches the portion of the cam c, all flow is cut off by the spool 65, except for the return flow of fluid from the motor through 94. To maintain the cargo valve in the open position, the valve 57 is moved to position 2, to provide the hydraulic lock referred to.

If the cargo valve is to be closed, the valve 57 is moved to position 3. This allows fluid under pressure from 91, to reach the connection 27 of the motor, thus causing it to operate in reversed direction. The fluid discharged from the motor, flows into the control valve 53 through 89 and 81. However, since the spool 65 will be in position c, the only route for escape of the fluid is through the flow restricting valve 76 and its associated restrictor formed by the sleeve 80. Flow takes place through 82 and cavity 81 to the passage 88 and thence to the reservoir 93. This causes the valve to close and restrict its speed but the pressure applied is sufficient to free any valve which may be stuck in the open position.

The movement of the cargo valve towards its closed position causes the cam to reach the portion b on the cam 49. The discharge of fluid from the motor 25 will now take place directly through 89, through the cavities 73 and 72, which are in communication, and then through 81 and 88. This removes the restriction to flow so that movement will be relatively fast.

However, as the cam moves further, the roller will engage the portion a, thus, shutting off the return flow to the reservoir. However, fluid can still return through the flow restricting valve 76 and it does so until the valve is fully closed.

Closure of the cargo valve will stop the motor at a torque value which is determined by the pre-stress in the spring 77 of the valve 76. The valve 57 is now moved to the position 2, thus providing the hydraulic lock.

The arrangement described allows full pressure to be applied to the motor under opening conditions irrespective of the setting of the spring 77 but this valve limits the closing torque which can be applied, thus, minimising the risk of over loading of the cargo valve seating.

To limit movement of the ball 76 against its spring 77, moreover, the spring is seated upon a piston 95 which tends to damp the movement of the ball 76.

I claim:

1. A valve actuator comprising a housing, an actuating rod in the housing, an hydraulically operated motor drivingly connected to the actuating rod, a valve connectible to the actuating rod whereby it is actuated, cam means carried by the actuating rod and movable in response to movement thereof, an hydraulic control valve engaging the cam means to regulate supply of hydraulic fluid under pressure to the hydraulic motor, in accordance with the position of the actuating rod, the cam means, when the valve is in a closed position, setting the hydraulic control valve to provide maximum hydraulic fluid pressure for opening said valve.

2. A valve actuator as claimed in claim 1 in which the hydraulic control valve has a movable actuating member engaging, the cam means having a cam surface on which said actuating member engages, which varies in radial spacing from an axis of the rod along its length.

3. A valve actuator as claimed in claim 2, in which the movable actuating member of said hydraulic control valve is engageable on respective portions of said cam surface providing differing settings of said control valve corresponding with different hydraulic fluid pressures to the hydraulic motor during opening and closing actuation of the valve.

4. A valve actuator as claimed in claim 3, in which the hydraulic control valve comprises a spool to which the actuating member is connected, a bore occupied by the spool, passage means for the flow of hydraulic fluid through the control valve, and means defining a restriction to flow and pressurising means in one of said passage means, through which flow takes place when said actuating rod is in the position corresponding with the closed position of said valve.

5. A valve actuator as claimed in claim 3, in which the hydraulic control valve comprises a spool to which the actuating member is connected, a bore occupied by the spool, passage means for the flow of hydraulic fluid through the control valve, and further means defining a restriction to flow and pressurising means in a further one of said passage means, through which flow takes place when said actuating rod is in a position corresponding with an open position of said valve.

6. A valve actuator as claimed in claim 1, in which the hydraulic control valve is connected hydraulically with which controls supply and exhaust of hydraulic fluid to and from said hydraulic control valve to which it is hydraulically connected and thence to the hydraulically operated motor, said further valve also providing for hydraulic locking of the hydraulic control valve.

7. A valve actuator as claimed in claim 1, wherein the actuating rod is provided with means whereby it can be manually driven to actuate the valve, and means in the actuator for disconnecting the drive between the hydraulically operated motor and the actuating rod when manual actuation of the rod is required.

* * * * *